United States Patent
Kang et al.

(10) Patent No.: US 9,912,394 B2
(45) Date of Patent: Mar. 6, 2018

(54) METHOD AND APPARATUS FOR PERFORMING FEEDBACK FOR MASSIVE ANTENNA ARRAY BASED BEAMFORMING IN WIRELESS COMMUNICATION SYSTEM

(71) Applicant: LG ELECTRONICS INC., Seoul (KR)

(72) Inventors: Jiwon Kang, Seoul (KR); Sunam Kim, Seoul (KR); Kitae Kim, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/302,473

(22) PCT Filed: Sep. 3, 2014

(86) PCT No.: PCT/KR2014/008253
§ 371 (c)(1),
(2) Date: Oct. 6, 2016

(87) PCT Pub. No.: WO2015/156457
PCT Pub. Date: Oct. 15, 2015

(65) Prior Publication Data
US 2017/0026101 A1    Jan. 26, 2017

Related U.S. Application Data

(60) Provisional application No. 61/977,596, filed on Apr. 9, 2014.

(51) Int. Cl.
*H04B 7/02* (2017.01)
*H04B 7/06* (2006.01)
(Continued)

(52) U.S. Cl.
CPC ......... *H04B 7/0639* (2013.01); *H04B 7/0413* (2013.01); *H04B 7/0456* (2013.01);
(Continued)

(58) Field of Classification Search
CPC ..... H04L 1/0618; H04L 1/06; H04L 25/0204; H04L 27/2647; H04L 5/0007;
(Continued)

(56) References Cited

U.S. PATENT DOCUMENTS

2004/0166887 A1* 8/2004 Laroia ................. H04B 7/0491
455/522
2007/0076807 A1* 4/2007 Jin ....................... H04L 1/0025
375/260
(Continued)

FOREIGN PATENT DOCUMENTS

EP          2690798         1/2014

OTHER PUBLICATIONS

PCT International Application No. PCT/KR2014/008253, Written Opinion of the International Searching Authority dated Jan. 8, 2015, 12 pages.

*Primary Examiner* — Zewdu Kassa
(74) *Attorney, Agent, or Firm* — Lee, Hong, Degerman, Kang & Waimey

(57) ABSTRACT

A method for transmitting feedback information to a base station at a user equipment (UE) in a wireless communication system is disclosed. The method includes receiving a pilot signal from the base station at a first time and a second time, measuring first channel quality at the first time and second channel quality at the second time based on the pilot signal and transmitting the feedback information including information about a variation value between the first channel quality and the second channel quality to the base station.

10 Claims, 16 Drawing Sheets

(51) Int. Cl.
*H04B 7/0413* (2017.01)
*H04B 7/0456* (2017.01)
*H04B 7/04* (2017.01)
*H04B 17/24* (2015.01)

(52) U.S. Cl.
CPC ......... *H04B 7/0478* (2013.01); *H04B 7/0617* (2013.01); *H04B 7/0619* (2013.01); *H04B 17/24* (2015.01)

(58) Field of Classification Search
CPC ............. H04L 27/2657; H04L 27/2662; H04L 5/0048; H04L 25/4902; H04L 1/0009; H04L 1/0041; H04L 25/49; H04L 5/04; H04B 7/0417; H04B 7/0669; H04B 3/54
USPC ................ 375/267, 260, 259, 316, 295, 219
See application file for complete search history.

(56) References Cited

U.S. PATENT DOCUMENTS

| | | |
|---|---|---|
| 2008/0207135 A1 | 8/2008 | Varadarajan et al. |
| 2012/0076032 A1 | 3/2012 | Mundarath et al. |
| 2013/0051321 A1 | 2/2013 | Barbieri et al. |
| 2013/0121247 A1 | 5/2013 | Seo et al. |

\* cited by examiner

FIG. 2
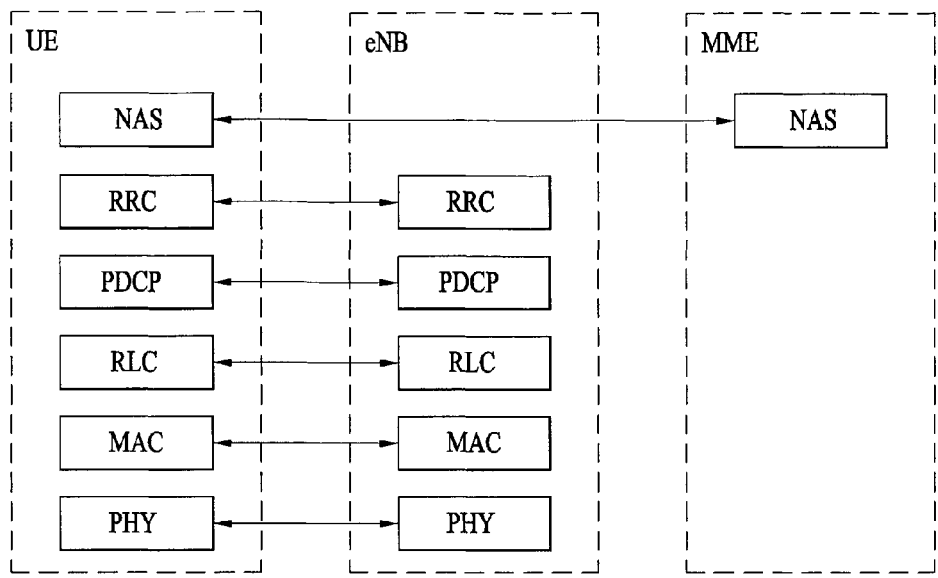
(A) CONTROL-PLANE PROTOCOL STACK
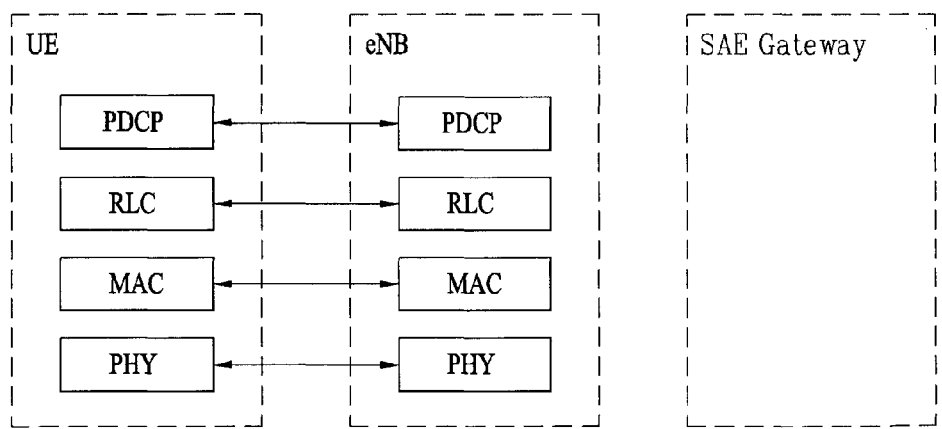
(B) USER-PLANE PROTOCOL STACK (a) CONVENTIONAL ANTENNA SYSTEM (b) AAS Antenna Port #1
Antenna Port #2
Antenna Port #3
Antenna Port #4

METHOD AND APPARATUS FOR PERFORMING FEEDBACK FOR MASSIVE ANTENNA ARRAY BASED BEAMFORMING IN WIRELESS COMMUNICATION SYSTEM

CROSS-REFERENCE TO RELATED APPLICATIONS

This application is the National Stage filing under 35 U.S.C. 371 of International Application No. PCT/KR2014/008253, filed on Sep. 3, 2014, which claims the benefit of U.S. Provisional Application No. 61/977,596, filed on Apr. 9, 2014, the contents of which are all hereby incorporated by reference herein in their entirety.

TECHNICAL FIELD

The present invention relates to a wireless communication system and, more particularly, to a method and apparatus for performing feedback for massive antenna array based beamforming in a wireless communication system.

BACKGROUND ART

As an example of a wireless communication system to which the present invention is applicable, a 3rd Generation Partnership Project (3GPP) Long Term Evolution (LTE) communication system will be schematically described.

FIG. 1 is a diagram showing a network structure of an Evolved Universal Mobile Telecommunications System (E-UMTS) as a wireless communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQest (IARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include an AG, a network node for user registration of the UE, etc. The AG manages mobility of a UE on a Tracking Area (TA) basis. One TA includes a plurality of cells.

Although wireless communication technology has been developed up to Long Term Evolution (LTE) based on Wideband Code Division Multiple Access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method and apparatus for performing feedback for massive antenna array based beamforming in a wireless communication system.

Technical Solution

The object of the present invention can be achieved by providing a method for transmitting feedback information to a base station at a user equipment (UE) in a wireless communication system including receiving a pilot signal from the base station at a first time and a second time, measuring first channel quality at the first time and second channel quality at the second time based on the pilot signal, and transmitting the feedback information including information about a variation value between the first channel quality and the second channel quality to the base station.

The pilot signal may include a plurality of pilot signals defined as a vertical precoder index and a horizontal precoder index, and the feedback information may include preferred vertical precoder index variation information between a preferred vertical precoder index at the first time and a preferred vertical precoder index at the second time and preferred horizontal precoder index variation information between a preferred horizontal precoder index at the first time and a preferred horizontal precoder index at the second time.

The preferred vertical precoder index variation information and the preferred horizontal precoder index variation information may be included in the feedback information if the precoder index variation value is equal to or greater than a threshold.

Additionally, the method may further include selecting a first precoding matrix index corresponding to the first time and a second precoding matrix index corresponding to the second time from a predetermined codebook based on the pilot signal, and the feedback information may include information about a difference between the first precoding matrix index and the second precoding matrix index. In particular, the predetermined codebook is composed of a plurality of precoding matrix indices for rank 1 arranged in order of beamforming angle.

The measuring the first channel quality and the second channel quality may include measuring the first channel quality and the second channel quality on the assumption that a predetermined precoding matrix index set is applied.

In another aspect of the present invention, provided herein is a method for receiving feedback information from a user equipment (UE) at a base station in a wireless communication system including transmitting a pilot signal at a first time and a second time to the UE and receiving, from the UE, the feedback information including information about a variation value between first channel quality at the first time and second channel quality at the second time generated using the pilot signal.

Advantageous Effects

According to embodiments of the present invention, a user equipment (UE) can efficiently perform feedback, that is, report channel variation information, for beamforming using a massive antenna array in a wireless communication system and an eNB can efficiently perform beamforming using a massive antenna array based on the channel variation information.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

MODE FOR INVENTION

Figure 1:
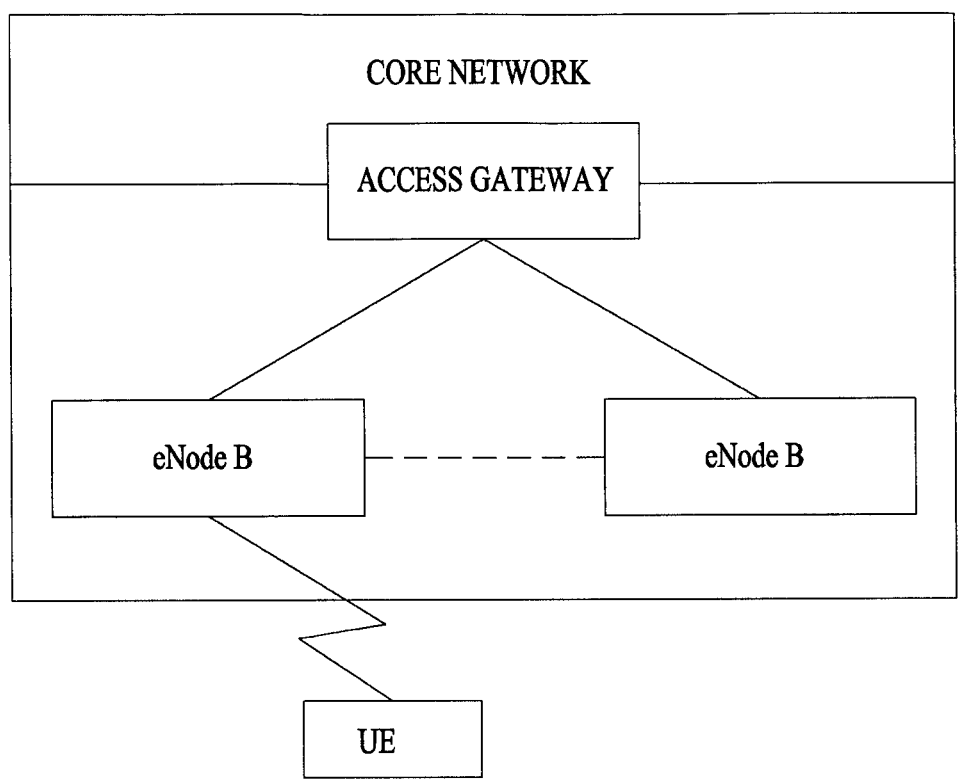
FIG. 1 is a diagram showing a network structure of an Evolved Universal Mobile Telecommunications System (E-UMTS) as an example of a wireless communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

In addition, in the present specification, the term "base station" may include a remote radio head (RRH), an eNB, a transmission point (TP), a reception point (RP), a relay, etc.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel. (PCCH), a Common Control Channel (CCCH), a Multicast Control Channel (MCCH), and a Multicast Traffic Channel (MTCH).

Figure 3:
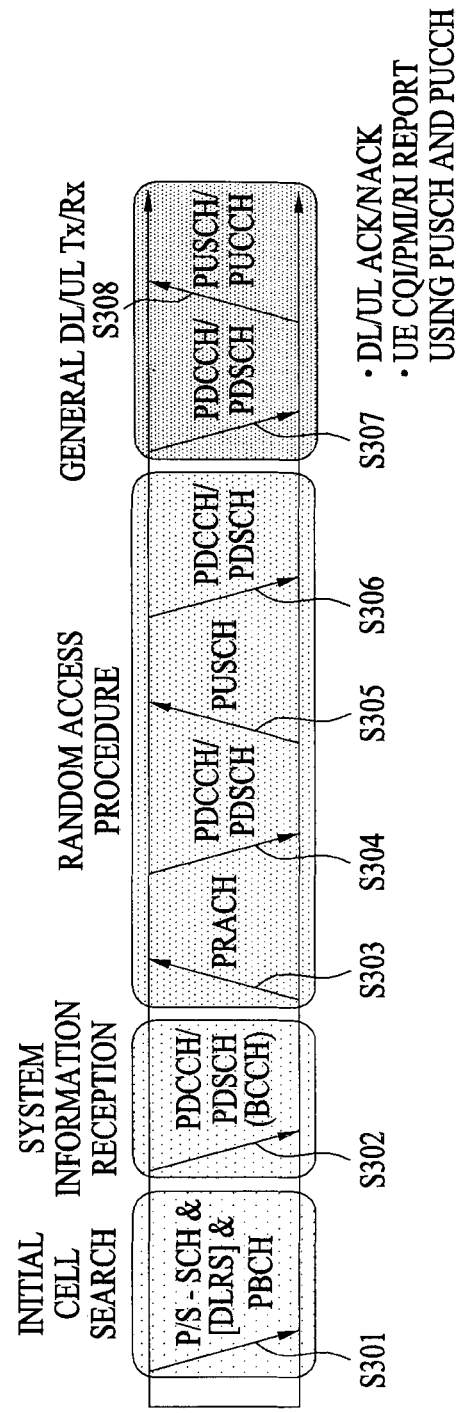
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
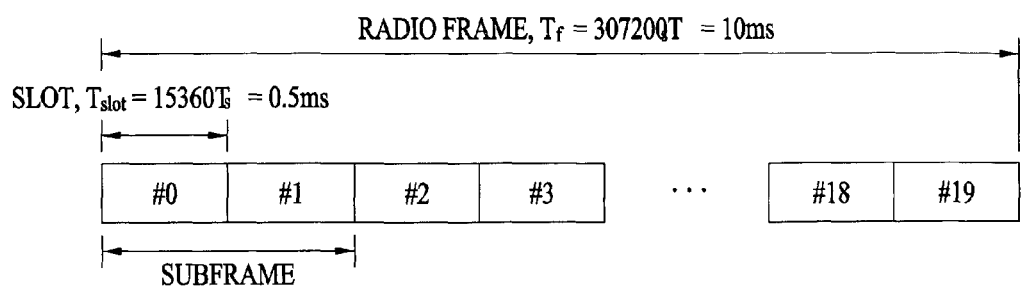
FIG. 4 is a diagram showing the structure of a radio frame used in a Long Term Evolution (LTE) system.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Figure 5:
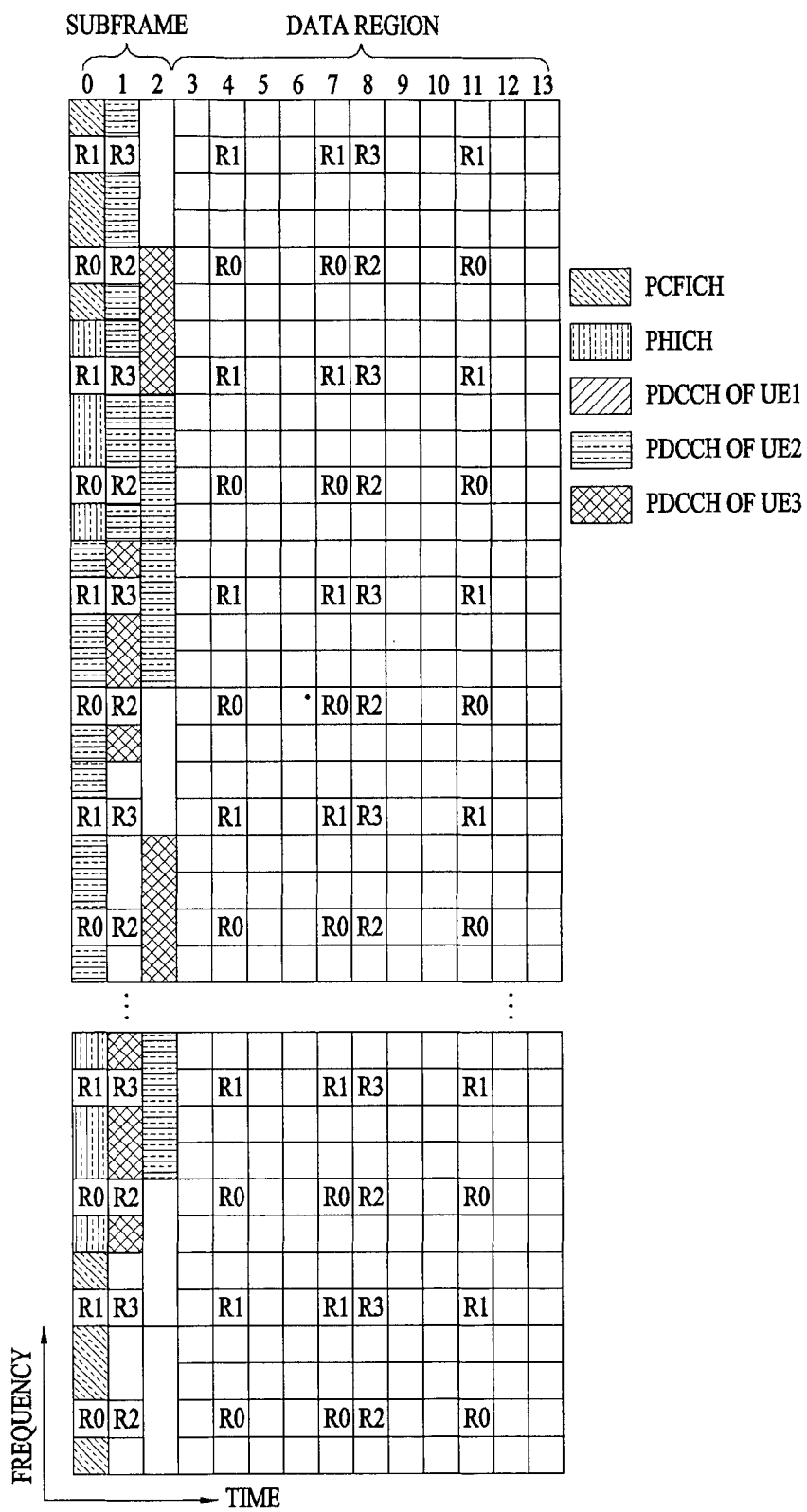
FIG. 5 is a diagram showing the structure of a downlink radio frame used in an LTE system.

FIG. 5 is a diagram showing a control channel included in a control region of one subframe in a downlink radio frame.

Referring to FIG. 5, a subframe includes 14 OFDM symbols. The first to third OFDM symbols are used as a control region and the remaining 13 to 11 OFDM symbols are used as a data region, according to subframe configuration. In FIGS. 5, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID).

One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 6:
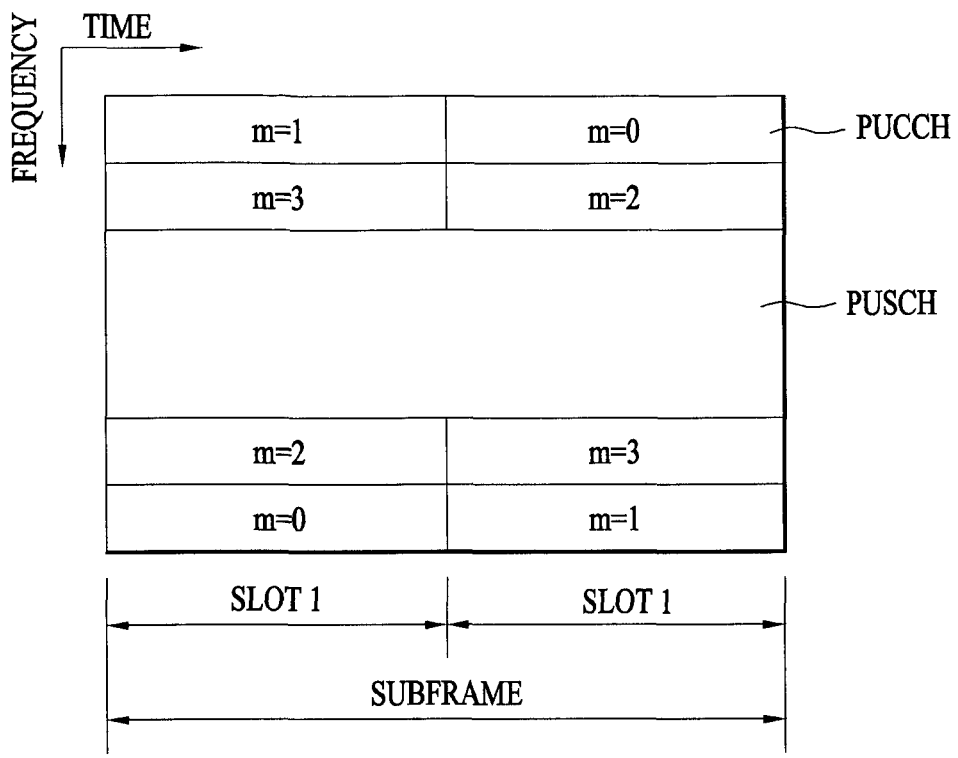
FIG. 6 is a diagram showing the structure of an uplink subframe used in an LTE system.

FIG. 6 is a diagram showing the structure of an uplink subframe used in an LTE system.

Referring to FIG. 6, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and. both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or sub-carriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 7:
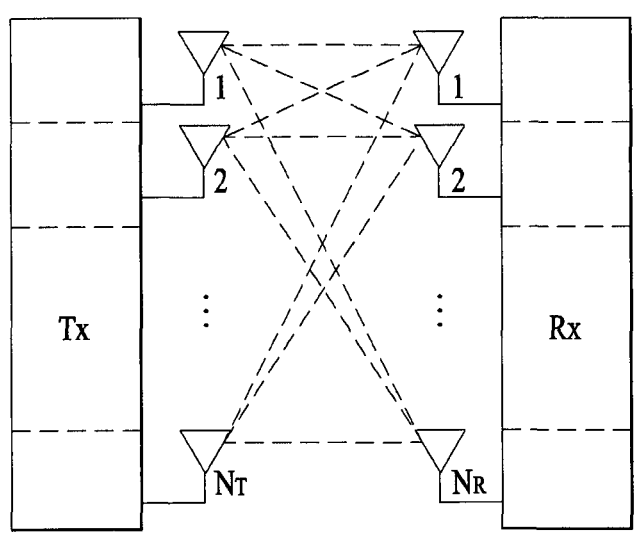
FIG. 7 is a diagram showing the configuration of a general multiple input multiple output (MIMO) system.

The configuration of the general multi-antenna (MIMO) communication system is shown in FIG. 7. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1 below. Here, $R_i$ is the smaller of the two values $N_T$ and $N_R$.

$$R_i = \min(N_T, N_R) \qquad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 7, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2 below.

$$S=[S_1, S_2, \ldots, S_{N_T}]^T \quad \text{[Equation 2]}$$

The transmitted information $S_1, S_2, \ldots S_{N_T}$ may have different transmit powers. If the respective transmit powers are $P_1, P^2, \ldots, P_{N_T}$ the transmitted information with adjusted powers may be expressed by a vector shown in Equation 3 below.

$$\hat{s}=[\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be expressed using a diagonal, matrix P of the transmit powers as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Considers that the $N_T$ actually transmitted signals $X_1, X_2, \ldots, X_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $X_1, X_2, \ldots, X_{N_T}$ may be expressed by using a vector X as shown in Equation 5 below. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank }(H) \leq \min(N_T, N_R) \quad \text{[Equation 6]}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7 below.

$$\text{\# of streams} \leq \text{rank}(H) \leq \min(N_T, N_R) \quad \text{[Equation 7]}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

Now, a description of a Channel State Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH or a PUSCH to command the UE to feed back CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a period longer than that of PMI or CQI.

Second, PMI is a value reflecting a spatial characteristic of a channel and indicates a precoding matrix index of the eNB preferred by the UE based on a metric of Signal-to-Interference plus Noise Ratio (SINR). Lastly, CQI is information indicating the strength of a channel and indicates a reception SINR obtainable when the eNB uses PMI.

In an evolved communication system such as an LTE-A system, multi-user diversity using Multi-User MIMO (MU-MIMO) is additionally obtained. Since interference between UEs multiplexed in an antenna domain exists in the MU-MIMO scheme, CSI accuracy may greatly affect not only interference of a UE that has reported CSI but also interference of other multiplexed UEs. Hence, in order to correctly perform MU-MIMO operation, it is necessary to report CSI having accuracy higher than that of a Single User-MIMO (SU-MIMO) scheme.

Accordingly, LTE-A standard has determined that a final PMI should be separately designed into W1, which a long-term and/or wideband PMI, and W2, which is a short-term and/or subband PMI.

An example of a hierarchical codebook transform scheme configuring one final PMI from among W1 and W2 may use a long-term covariance matrix of a channel as indicated in Equation 8:

$$W = \text{norm}(W1 W2) \quad \text{[Equation 8]}$$

In Equation 8, W2 of a short-term PMI indicates a codeword of a codebook configured to reflect short-term channel information, W denotes a codeword of a final codebook, and norm(A) indicates a matrix in which a norm of each column of a matrix A is normalized to 1.

The detailed configurations of W1 and W2 are shown in Equation 9:

$$W1(i) = \begin{bmatrix} X_i & 0 \\ 0 & X_i \end{bmatrix}, \quad \text{[Equation 9]}$$

where $X_i$ is $Nt/2$ by $M$ matrix.

$$W2(j) = \overbrace{\begin{bmatrix} e_M^k & e_M^l & e_M^m \\ \alpha_j e_M^k & \beta_j e_M^l & \cdots & \gamma_j e_M^m \end{bmatrix}}^{r\ columns} \text{ (if rank = }r\text{),}$$

where $1 \le k, l, m \le M$ and $k, l, m$ are integer.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown as follows:

$$W1(i) * W2(j) = \begin{bmatrix} X_i(k) \\ \alpha_j X_i(k) \end{bmatrix} \quad \text{[Equation 10]}$$

In Equation 10, a codeword is expressed as a vector of $N_T \times 1$ (where NT is the number of Tx antennas) and is structured with an upper vector $X_i(k)$ and a lower vector $a_j X_i(k)$ which show correlation characteristics of a horizontal antenna group and a vertical antenna group, respectively. $X_i(k)$ is preferably expressed as a vector having the characteristics of linear phase increment by reflecting the characteristics of a correlation between antennas of each antenna group and may be a DFT matrix as a representative example.

Hereinafter, an active antenna system (AAS) and three-dimensional (3D) beamforming will be described.

In an existing cellular system, a base station has used a method for reducing inter-cell interference (ICI) using mechanical tilting or electrical tilting and improving throughput, e.g., signal to interference plus noise ratios (SINRs), of UEs of a cell, which will be described in greater detail with reference to the drawings.

Figure 8:
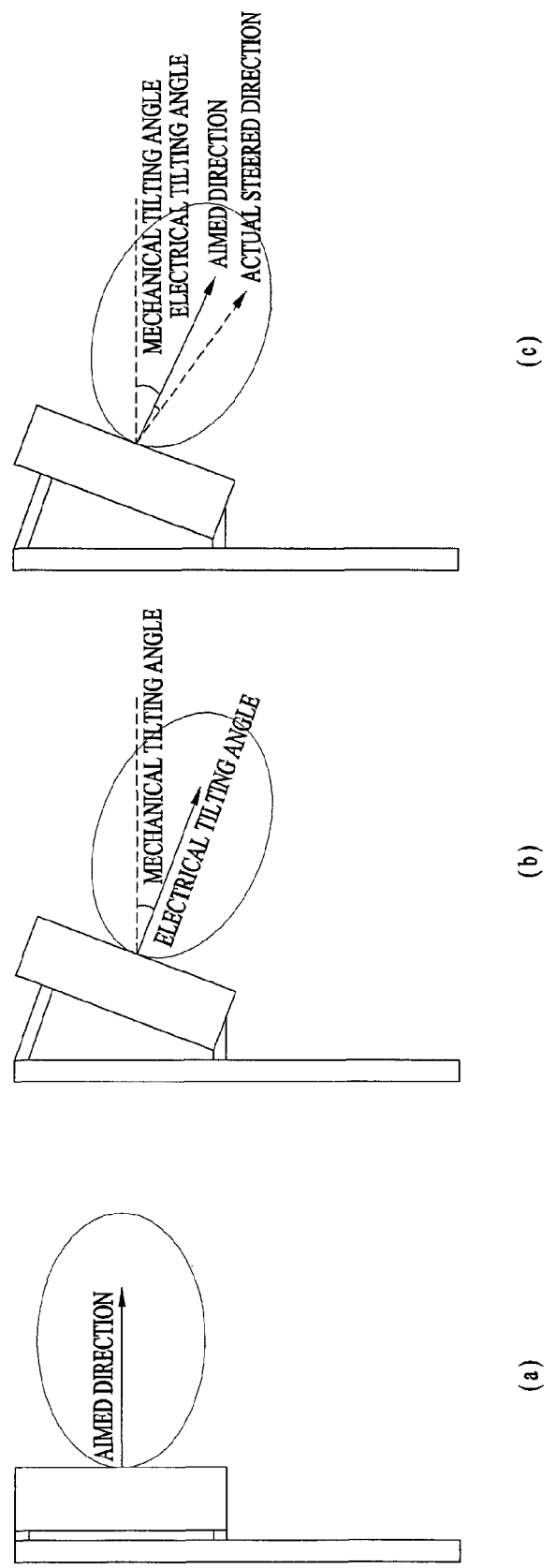
FIG. 8 is a diagram illustrating an antenna tilting scheme.

FIG. 8 is a diagram illustrating an antenna tilting method. In particular, FIG. 8(a) shows an antenna structure to which antenna tilting is not applied, FIG. 8(b) shows an antenna structure to which mechanical tilting is applied, and FIG. 8(c) shows an antenna structure to which both mechanical tilting and electrical tilting are applied.

In comparison of FIG. 8(a) with FIG. 8(b), when mechanical tilting is applied, a beam direction is fixed upon initial installation as shown in FIG. 8(b). Further, when electrical tilting is applied, as shown in FIG. 8(c), a tilting angle may be changed using an internal phase shift module but only restrictive vertical beamforming is possible due to fixed tilting.

Figure 9:
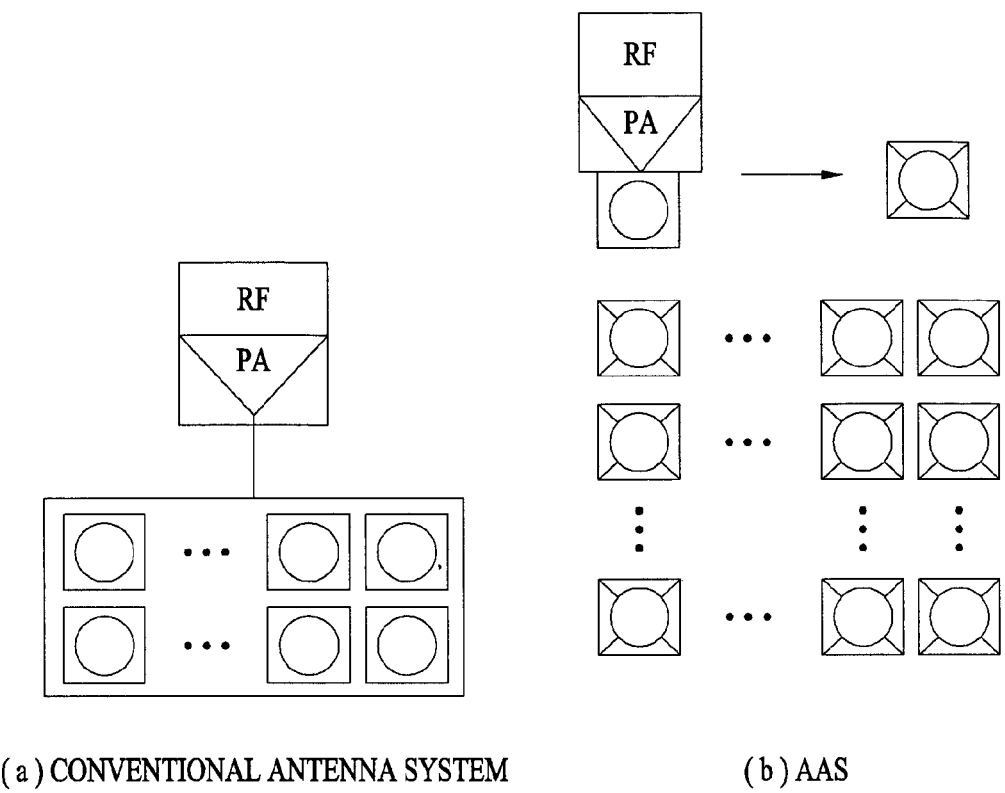
FIG. 9 is a diagram comparing comparison between an existing antenna system and an active antenna system.

FIG. 9 is a diagram showing comparison between an existing antenna system and an active antenna system. In particular, FIG. 9(a) shows an existing antenna system and FIG. 9(b) shows an active antenna system.

Referring to FIG. 9, unlike the existing antenna system, the active antenna system is characterized in that power and phase adjustment of each antenna module is possible because each of a plurality of antenna modules includes a RF module including a power amplifier, that is, an active element.

As a general MIMO antenna structure, a linear antenna array, that is, one-dimensional antenna array, such as a uniform linear array (ULA), was considered. In the one-dimensional array structure, beams which may be formed by beamforming are present in a two-dimensional plane. This is applied to a passive antenna system (PAS)-based MIMO structure of an existing base station. Although vertical antennas and horizontal antennas are present even in a PAS based base station, the vertical antennas are fixed to one RF module and thus beamforming is impossible in a vertical direction and only mechanical tilting is applicable.

However, as an antenna structure of a base station has evolved to an active antenna system, independent RF modules may be implemented in vertical antennas and thus beamforming is possible not only in a horizontal direction but also in a vertical direction. This is referred to as vertical beamforming or elevation beamforming.

According to vertical beamforming, since formable beams may be expressed in three-dimensional space in vertical and horizontal directions, vertical beamforming may be referred to as three-dimensional beamforming. That is, three-dimensional beamforming becomes possible by evolution from a one-dimensional antenna array structure to a two-dimensional planar antenna array structure. Three-dimensional beamforming is possible not only in a planar antenna array structure but also in a ring-shaped three-dimensional array structure. Three-dimensional beamforming is characterized in that a MIMO process is performed in a three-dimensional space because various antenna structures may be used in addition to the one-dimensional antenna array structure.

Figure 10:
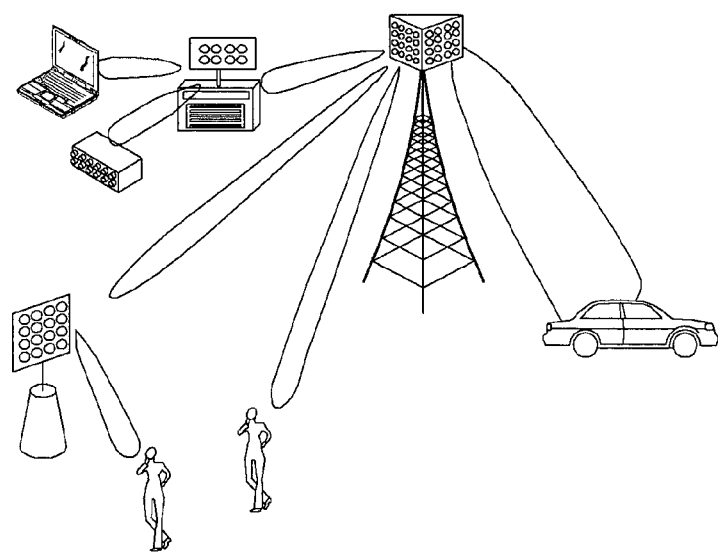
FIG. 10 is a diagram showing an example of forming a UE-specific beam based on an active antenna system.

FIG. 10 is a diagram showing an example of forming a UE-specific beam based on an active antenna system. Referring to FIG. 10, due to three-dimensional beamforming, beamforming is possible not only when a UE moves from side to side but also when a UE moves back and forth, thereby providing a higher degree of freedom to UE-specific beamforming.

Further, as a transmission environment using a two-dimensional antenna array structure based on an active antenna, an environment in which an outdoor eNB transmits a signal to an outdoor UE, an environment in which an outdoor eNB transmits a signal to an indoor UE (outdoor to indoor; O2I) and an environment in which an indoor eNB transmits a signal to an indoor UE (indoor hotspot) may be considered.

Figure 11:
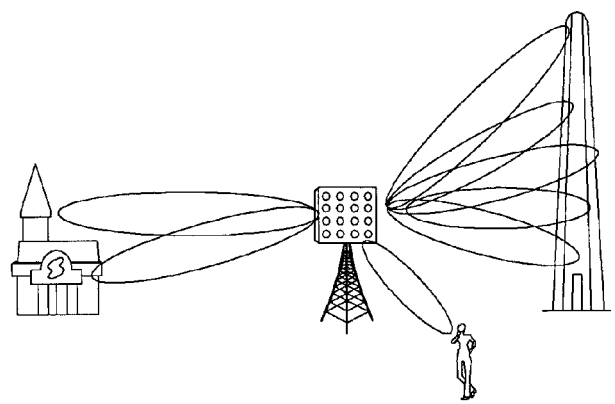
FIG. 11 is a diagram showing a 3-dimensional (3D) beam transmission scenario based on an active antenna system.

FIG. 11 is a diagram showing a 3-dimensional (3D) beam transmission scenario based on an active antenna system.

Referring to FIG. 11, in an actual cell environment in which a plurality of buildings is present per cell, an eNB needs to consider vertical beam steering capabilities considering various UE heights due to building heights as well as UE-specific horizontal beam steering. In such a cell environment, channel properties different from those of an existing radio channel environment, e.g., shadow/path loss change due to height difference, fading property change, etc. need to be applied.

In other words, thee-dimensional beamforming is evolved from horizontal beamforming based on a one-dimensional linear antenna array structure and refers to a MIMO processing scheme which is an extension to or a combination with elevation beamforming or vertical beamforming based on an antenna structure of a multi-dimensional array, such as a planar antenna array, or a massive antenna array.

The massive antenna array has one or more of the following characteristics. That is, i) the massive antenna array is located on a two-dimensional (2D) plane or in a 3D space, ii) the number of logical or physical antennas is eight or more (here, the logical antenna may be expressed by an antenna port) and iii) each antenna is composed of an AAS. However, definition of the massive antenna array is not limited thereto. Hereinafter, various beamforming schemes using a massive antenna array will be described.

a) Partial antenna array based beamforming applied to a 3D beamforming environment is referred to as beam-width adaptation (BA) beamforming, which has the following features.

Figure 12:
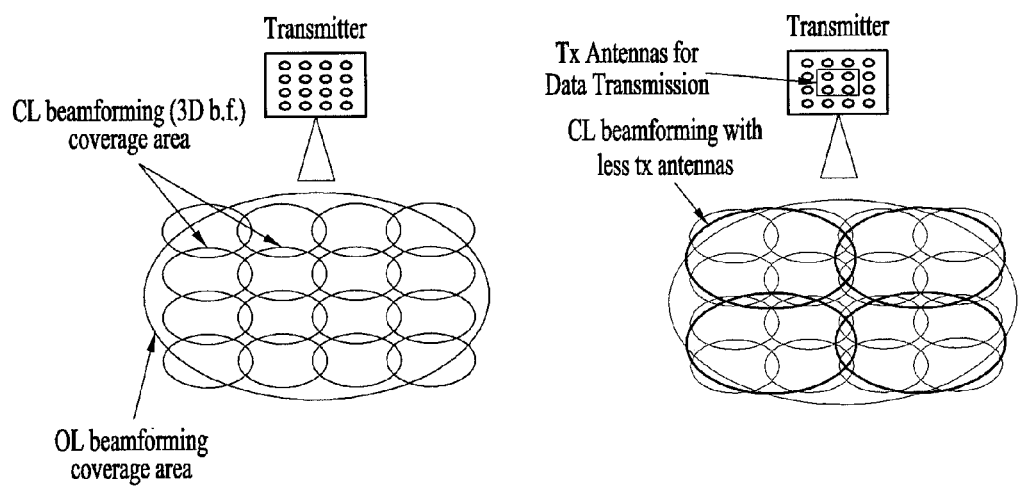
FIG. 12 is a diagram showing comparison in beam coverage between an existing MIMO transmission scheme and a BA beamforming scheme.

In the BA beamforming scheme, the number of antennas participating in data transmission is adjusted according to the speed of a UE to adjust a transmission beam width. FIG. 12 is a diagram showing comparison in beam coverage between an existing MIMO transmission scheme and a BA beamforming scheme. In particular, the left side of FIG. 12 shows the existing MIMO transmission scheme and the right side thereof shows the BA beamforming scheme.

Referring to the left side of FIG. 12, in a 4×4 antenna array, if a UE moves at a medium speed, the width of a beam transmitted by the 4×4 antenna array is too narrow to obtain channel accuracy. Since an open-loop scheme covers whole cell coverage, the beam width may be excessively wide. As shown in the right side of FIG. 12, if only two 2×2 central antenna arrays participate in transmission, a beam having a relatively wide beam width and capable of obtaining beam gain may be generated. That is, the number of antennas participating in transmission to the UE is reduced according to the speed of the UE to increase the beam width, thereby acquiring beam gain lower than that of closed-loop beamforming but higher than that of open-loop beamforming.

b) If the beam width is adjusted according to mobility of the UE in the BA beamforming scheme, a method for performing beamforming in a vertical or horizontal direction according to the movement direction of the UE and performing open loop precoding may also be considered. This technology is referred to as dimension adaptation (DA) beamforming because 2D beamforming may be performed in a 3D beamforming environment.

Figure 13:
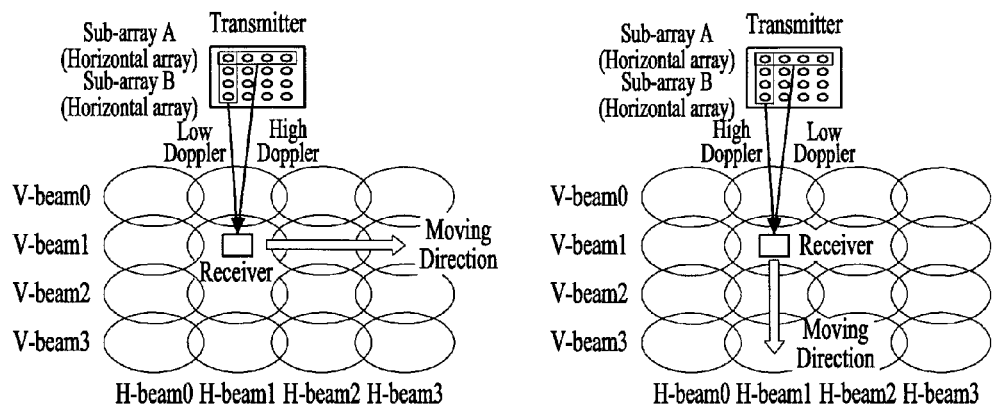
FIG. 13 is a diagram showing the concept of a DA beamforming scheme.

The DA beamforming scheme is a beamforming scheme for, at an eNB, applying an open-loop scheme to the direction, in which movement of the UE is big, that is, the direction, in which the Doppler effect is high, of the vertical direction and the horizontal direction and applying a closed-loop scheme to the other direction. FIG. 13 is a diagram showing the concept of a DA beamforming scheme. In particular, the left side of FIG. 13 shows the case in which a UE moves in a horizontal direction and the right side thereof shows the case in which a UE moves in a vertical direction.

Figure 14:
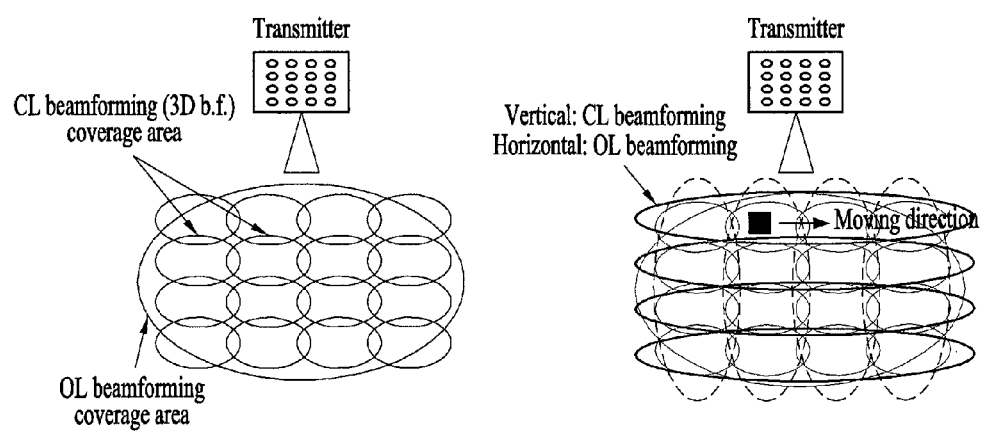
FIG. 14 is a diagram showing the features of a DA beamforming scheme.

FIG. 14 is a diagram showing the features of a DA beamforming scheme.

Figure 15:
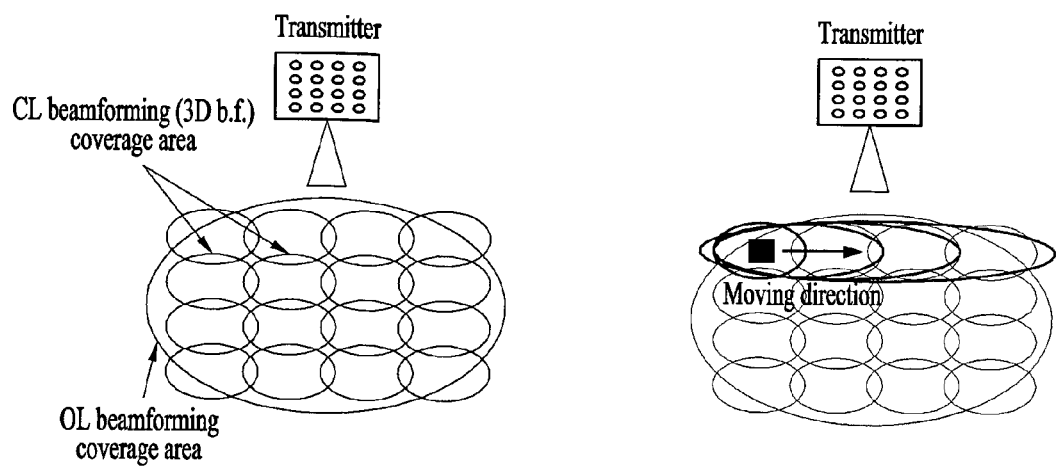
FIG. 15 is a diagram showing the concept of a DBA beamforming scheme.

If a DA beamforming scheme is used, beam gain can be obtained in a direction in which the Doppler effect is low but cannot be obtained in a direction in which the Doppler effect is high. Accordingly, in an area in which a beam is generated, a beam having a narrow width is generated in one of a horizontal direction and a vertical direction as shown in FIG. 14. Accordingly, it is possible to provide beam gain having a predetermined level to a UE moving in a specific direction.

c) Dimension and beam-width adaptation (DBA) which is a combination of a BA beamforming scheme and a DA beamforming scheme may also be considered. FIG. 15 is a diagram showing the concept of a DBA beamforming scheme.

The DBA beamforming scheme is a combination of a DA beamforming scheme and a BA beamforming scheme. Referring to FIG. 15, if a UE moves in a vertical or horizontal direction upon applying the DBA beamforming scheme, closed-loop beamforming is performed in a direction in which the Doppler effect is low, that is, in a direction orthogonal to movement of a UE, and the number of antennas participating in transmission is adjusted according to the speed of the UE to adjust a beam width in a direction in which the Doppler effect having a predetermined level is present.

In summary, as shown in Table 1, the DA beamforming scheme is suitable when a UE moves at a high speed in a specific direction with respect to an eNB, the BA beamforming scheme is suitable when a UE moves at a low speed or a medium speed, and the DBA beamforming scheme is suitable when a UE moves in a specific direction at a low speed or a medium speed.

TABLE 1

| | |
|---|---|
| Dimension adaptation (DA) beamforming | A UE moves at a high speed in a vertical or horizontal direction with respect to an eNB. |
| Beam-width adaptation beamforming | Low-speed or medium-speed movement environment |
| DBA beamforming (DA + BA) | A UE moves in a vertical or horizontal direction with respect to an eNB at a low speed or a medium speed. |

In order to adaptively apply a beamforming scheme such as a DA/BA/DBA beamforming scheme according to channel variation, it is important to check whether a channel between an eNB and a UE is rapidly varied. In particular, for DA beamforming or DBA beamforming, both channel variation in a vertical direction and channel variation in a horizontal direction should be checked.

Accordingly, channel variation per unit time may be measured and reported by tracking variation in beamforming direction capable of maximizing channel gain.

In a 3GPP LTE system or a WiMax system, a UE estimates a MIMO channel and feeds PMI in a preferred beamforming direction back. At this time, PMI variation of a UE with time may mean channel variation. That is, if preferred PMI is rapidly varied, a channel environment is rapidly varied and, if preferred PMI is slowly varied, a channel environment is slowly varied. As a result, channel variation may be estimated via PMI tracking.

In PMI tracking, a method for, at an eNB, estimating channel variation using periodic/aperiodic PMI feedback information of a UE only may be considered. However, this method has the following limits.

1. Absence of initial PMI history information

That is, upon initial PMI reporting or upon aperiodic PMI reporting, there is a limit such as absence of a PMI history. In addition, even when a UE is switched from an open-loop transmission mode to a closed-loop transmission mode, there may be a limit such as absence of a PMI history.

2. Channel variation cannot be measured within a PMI reporting period

That is, when a PMI reporting period is X msec, it is difficult to measure channel variation in X msec.

3. Tracking accuracy limit according to PMI codebook size

More specifically, tracking accuracy is low in a state in which the size of a PMI codebook, that is, the number of bits allocated to PMI feedback, is restricted.

4. Difficulty in checking channel variation via PMI tracking upon PMI transmission of rank 2 or more Lastly, PMI of rank 2 or more refers to a matrix composed of orthogonal beamforming vectors corresponding in number to the rank. In this case, it is difficult to measure channel variation according to variation in PMI matrix.

In order to solve such problems, first, an eNB configures a pilot signal for enabling a UE to measure a PMI variation value and feedback related thereto. Thereafter, the UE measures the PMI variation value with respect to the pilot signal regardless of PMI feedback and performs feedback related thereto.

More specifically, according to operation of a current LTE system, a pilot signal (e.g., CSI-RS) is configured and, at the same time, whether PMI is reported is determined in a PUCCH/PUSCH reporting mode. Accordingly, the UE configures the pilot signal and, at the same time, determines whether the PMI of the pilot signal is calculated and reported. However, when the PMI variation value is measured, the UE performs a procedure of storing a PMI variation history with respect to specific pilot signals and reporting related information separately with the CSI reporting procedure.

The related feedback information may be configured using various methods. Examples of the feedback information related to PMI variation are as follows.

1) Variance or standard deviation of PMI during specific duration (see Equation 11 below)

$$\frac{1}{T} \sum_{t=T_0}^{T_0+T-1} (PMI_t - E\{PMI\})^2 \qquad \text{[Equation 11]}$$

where, $$E\{PMI\} = \frac{1}{T} \sum_{t=T_0}^{T_0+T-1} PMI_t$$

or $$E\{PMI\} = \frac{1}{T_0+T-1} \sum_{t=1}^{T_0+T-1} PMI_t,$$

a measurement time index, T0 denotes a measurement start time and T denotes a measurement duration.

2) PMI variation value during specific duration (see Equation 12)

$$PMI_{T_1} - PMI_{T_0} \qquad \text{[Equation 12]}$$

where, T0 denotes a reference time, T1 denotes a reporting time and is equal to T0+C (C being a constant).

3) PMI variation value to which a weight is applied (see Equation 13 below)

$$\sum_{t=T_0+1}^{T_1} w_t (PMI_t - PMI_{t-1}) \qquad \text{[Equation 13]}$$

where, wt denotes a weight at a time t, which may increase with time t.

4) PMI average variation value (see Equation 14 below)

$$\frac{1}{T}\left(\sum_{t=T_2}^{T_2+T-1} PMI_t - \sum_{t=T_0}^{T_0+T-1} PMI_t\right) \qquad \text{[Equation 14]}$$

where, $T_2 + T - 1 = $ reporting time $T1$.

In the above examples, for correlation between the PMI variation value and the channel variation, indices aligned in order of beamforming angle are used as PMI. If a PMI codebook used in an actual LTE system is reused, since the codebook is not aligned in order of beamforming angle, codebook permutation or rearrangement for rearranging the codebook in order of beamforming angle is further required.

For example, if existing codebook indices are arranged in order of beamforming angle of a uniform linear array (ULA), that is, in order of 0 degrees, 90 degrees, −90 degrees, 30 degrees and −30 degrees, a process of rearranging the indices in order of −90 degrees, −30 degrees, 0 degrees, 30 degrees and 90 degrees is required. Such a rearrangement process applies to only a PMI codebook for preferred beam tracking but does not apply to a PMI codebook for existing CSI feedback.

In order not to perform the rearrangement process, as in the following embodiment, a beamforming angle value indicated by PMI may be directly used. That is, as shown in Equation 15 below, a beamforming angle variation value of PMI during a specific duration is used as feedback information.

$$\text{Angle}(PMI_{T_1}) - \text{Angle}(PMI_{T_0}) \qquad \text{[Equation 15]}$$

where, T0 denotes a reference time, T1 denotes a reporting time and T1 is equal to T0+C (C being a constant). In addition, Angle(x) means a beamforming angle corresponding to a PMI index x.

Meanwhile, a PMI codebook for measuring a PMI variation value is newly defined or an existing PIM codebook is reused. At this time, i) the codebook is configured in order of beamforming angle, ii) the codebook is composed of rank-1 PMI only, iii) the codebook is elaborate, that is, the size of the codebook is greater than that of an existing codebook, and iv) existing rank-1 PMI is included. Here, features ii) and iii) can solve the above-described tracking accuracy problem and ambiguity in channel variation measurement due to PMI tracking in case of rank 2 or more.

Additionally, in feature iv), since transmission is performed based on the existing rank-1 PMI codebook upon closed-loop MIMO transmission via a single layer, the existing rank-1 PMI codebook is preferably included even upon channel variation measurement in consideration of an actual beamforming pattern. However, if some PMI is included in the existing rank-1 PMI codebook for purposes other than different antenna arrangement (e.g., cross polarization) or beamforming (e.g., for the purpose of selecting an antenna), this PMI may be excluded from the codebook for measuring the PMI variation value.

According to the above description, the problem that the initial PMI history is absent and the problem that the channel variation cannot be measured within the PMI reporting period can be solved. For example, when a CSI-RS is transmitted at a period of 4 msec, PMI reporting is performed at a period of 20 msec by independent pilot and feedback configuration but PMI history tracking is performed at a period of 4 msec. In this case, since feedback of the PMI history does not need to be performed at a period of 4 msec, feedback may be performed at a longer period such that feedback overhead is not increased. That is, the measurement period and the reporting period of the PMI variation value may be different from each other.

The PMI variation value may be aperiodically reported. That is, when the PMI is varied by a predetermined value or more, that is, if the channel variation is equal to or greater than a predetermined value, reporting may be performed. Alternatively, if the channel variation is not large, feedback is periodically performed and, if the channel variation is equal to or greater than the predetermined value, feedback of the PMI variation value is performed at a short period.

Accordingly, the UE may report the measured PMI variation value to the eNB at a predetermined period or only when the PMI variation value is equal to or greater than the predetermined value. Alternatively, the UE may determine the reporting period of the measured PMI variation value according to the PMI variation value.

A method of utilizing the above-described technology for measurement of the channel variation in the vertical and horizontal directions for DA beamforming or DBA beamforming will now be described.

First, a pilot for measuring a PMI variation value is divided into a pilot for channel variation measurement in a vertical direction and a pilot for channel variation measurement in a horizontal direction as shown in FIGS. 16 to 19.

Figure 16:
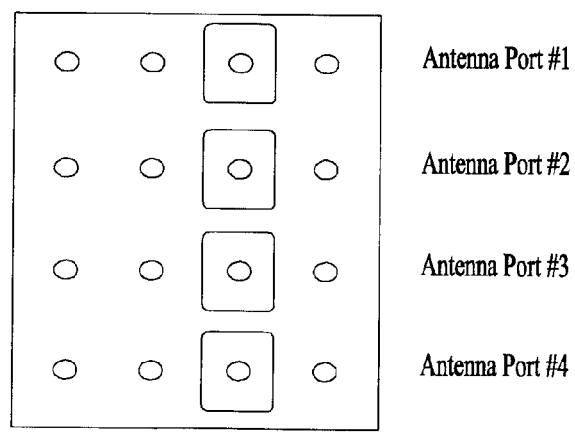
FIGS. 16 and 17 are diagrams showing examples of a pilot for channel measurement in a vertical direction.
Figure 17:
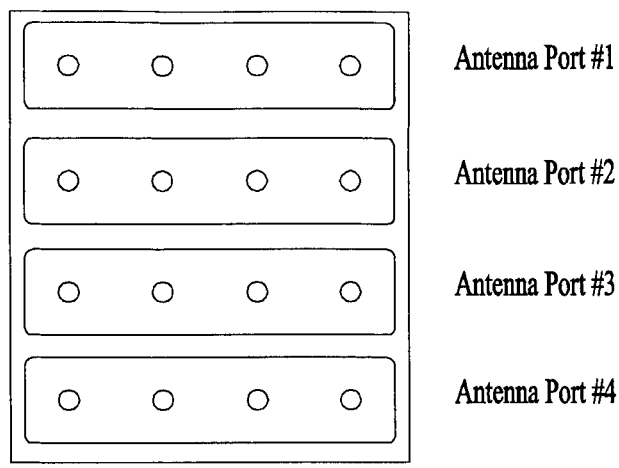

FIGS. 16 and 17 are diagrams showing examples of a pilot for channel measurement in a vertical direction according to an embodiment of the present invention. Referring to FIGS. 16 and 17, the pilot for channel variation measurement in the vertical direction is characterized in that antenna ports are sequentially mapped in the vertical direction of an antenna array.

Figure 18:
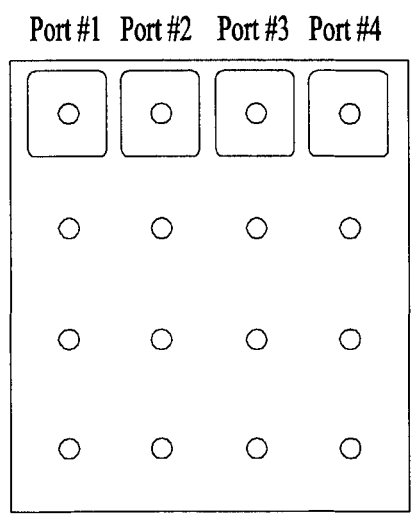
FIGS. 18 and 19 are diagrams showing examples of a pilot for channel measurement in a horizontal direction.
Figure 19:
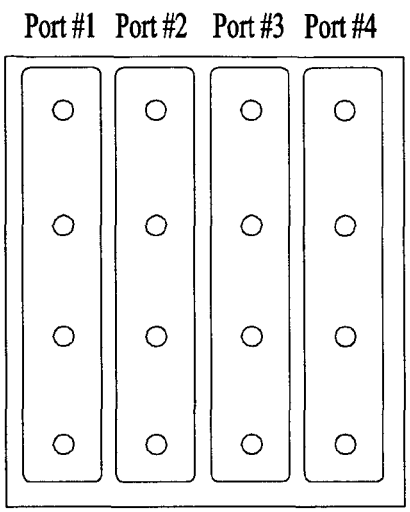

FIGS. 18 and 19 are diagrams showing examples of a pilot for channel measurement in a horizontal direction according to an embodiment of the present invention. Referring to FIGS. 18 and 19, the pilot for channel variation measurement in the horizontal direction is characterized in that antenna ports are sequentially mapped in the horizontal direction of an antenna array.

If the pilot for channel variation measurement in the vertical direction and the pilot for channel variation measurement in the horizontal direction are respectively transmitted using the above-described methods, the UE may measure and report the PMI variation values of the pilots so as to measure channel variation in the vertical direction and channel variation in the horizontal direction.

In application of the above-described PMI tracking technology, even when the pilot for channel variation measurement in the vertical direction and the pilot for channel variation measurement in the horizontal direction are simultaneously transmitted, the UE may measure and report a variation value of vertical PMI (hereinafter, referred to as V-PMI) and horizontal PMI (hereinafter, referred to as H-PMI) so as to measure channel variation in the vertical direction and channel variation in the horizontal direction.

The PMI tracking technology is valid if the number of PMI candidates is sufficient but may not have a desired level of accuracy if the number of PMI candidates is not sufficient due to restriction on a feedback channel. For example, if beam accuracy is set such that a beamforming angle is 10 degrees or more per PMI, it is difficult to measure channel variation by measuring the PMI variation only.

Accordingly, the present invention proposes a method for measuring and reporting channel quality variation in order to more accurately perform channel variation measurement. The proposed method for measuring and reporting channel quality variation may be used together with the above-described PMI tracking method.

First, the UE measures a channel quality variation value of a specific PMI set and performs feedback related thereto. The channel quality variation value may be defined with respect to each or all of PMI included in the PMI set. Channel quality may apply to a channel value (index), channel gain (index), channel quality (index), etc. The PMI set may be defined as a whole PMI set or a PMI set configured by a network. Additionally, the PMI set may be defined as a PMI set composed of N PMI selected by the UE, that is, a UE-selective PMI set.

In particular, the PMI set selected by the UE may include PMI determined based on receive power, received signal quality, signal to noise plus interference ratio (SINR), CQI, etc. and N may be predetermined or specified by the network.

Alternatively, the number N of PMI included in the PMI set may be determined according to received signal quality.

Even when the PMI is not varied during a specific duration, since a channel is varied during the specific duration, the present method measures and reports channel variation. Such variation is measured with respect to a specific PMI set and such a PMI set may be defined using various methods as described above.

Figure 20:
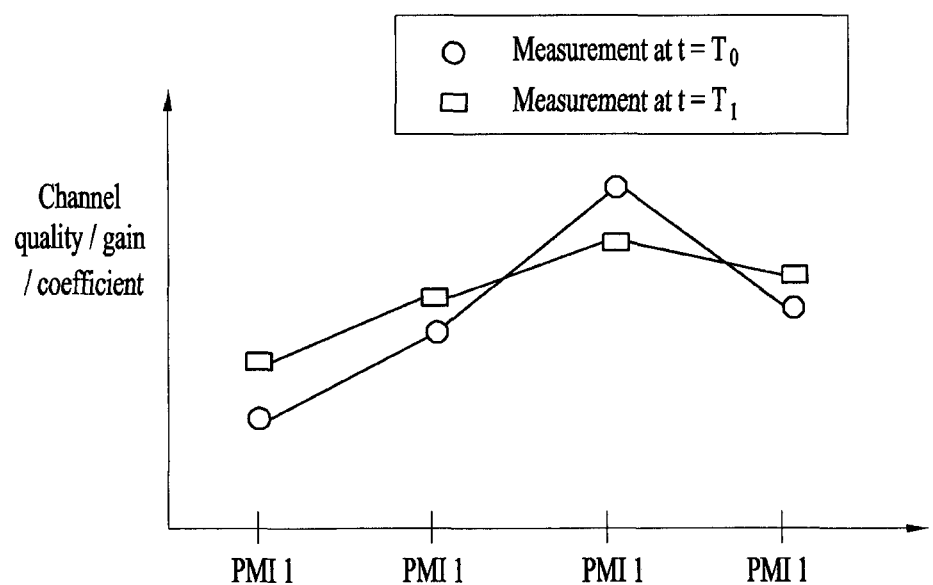
FIG. 20 is a diagram showing an example of calculating a channel variation value during a specific duration according to an embodiment of the present invention.

FIG. 20 is a diagram showing an example of calculating a channel variation value during a specific duration according to an embodiment of the present invention.

Referring to FIG. 20, if a UE-selective PMI set with N of 2 is used, PMI 3 and PMI 4 may be included in the PMI set based on the value measured at t=T0. Hereinafter, PMI elements included in the PMI are {PMI 1, PMI 2, ..., PMI N} and the channel quality value of PMI i at a time t is Q(i, t).

If only one channel variation value is defined with respect to the PMI set, the channel variation value may be defined using various methods as follows.

A) Secondary momentum related value of channel quality during a specific duration, such as variance or standard deviation (see Equation 16 below)

$$\frac{1}{N}\sum_{i=1}^{N}\sum_{t=T_0}^{T_1}\{Q(i,t) - E_t\{Q(i,t)\}\}^2 \qquad \text{[Equation 16]}$$

where, $E_t\{X\}$ denotes an average of X at time t, t denotes a measurement time index, $T_0$ denotes a measurement start time, $T_1$ denotes a measurement end time, and i denotes an index of each PMI element in the PMI set.

B) Channel quality variation value during a specific duration (see Equation 17 below)

$$\sum_{i=1}^{N}|Q(i,T_1) - Q(i,T_0)| \qquad \text{[Equation 17]}$$

or $$\sum_{i=1}^{N}|Q(i,T_1) - Q(i,T_0)|^2$$

C) Channel quality variation value to which a weight is applied (see Equation 18 below)

$$\sum_{t=T_0+1}^{T_1} w_t \sum_{i=1}^{N} |Q(i, t) - Q(i, t-1)| \qquad \text{[Equation 18]}$$

where, $w_t$ denotes a weight at a time t, which may increase with t.

D) Variation value of a channel quality average (see Equation 19 below)

$$\frac{1}{T} \sum_{i=1}^{N} \left( \sum_{t=T_2}^{T_2+T-1} Q(i, t) - \sum_{t=T_0}^{T_0+T-1} Q(i, t) \right) \qquad \text{[Equation 19]}$$

where, T denotes a measurement duration, that is, a window size, and $T_2+T-1$ denotes a reporting time $T_1$.

Feedback of the channel quality variation value may be performed at a period specified by the eNB or may be performed only when the channel quality variation value is equal to or greater than a predetermined value or the reporting period may be determined according to the channel quality variation value.

In order to use the proposed technology to measure channel variation in the vertical and horizontal directions for DA beamforming or DBA beamforming, channel quality variation values of a pilot for channel variation measurement in the vertical direction and a pilot for channel variation measurement in the horizontal direction may be measured/reported. For example, when the eNB includes a rectangular N×M antenna array and each antenna transmits a pilot, the UE may estimate a 1×M channel from the pilot signals transmitted at a specific row and measure/report a channel quality variation value of an H-PMI set of the channel. In addition, the UE may estimate a 1×N channel from the pilot signals transmitted at a specific column and measure/report a channel quality variation value of a V-PMI set.

Although a method for measuring channel variation of one row or column in the vertical/horizontal direction is described in the above example, an average of channel variation values of a plurality of rows or columns may be measured/reported.

Although the proposed technology is described on the assumption that PMI feedback is performed after receiving a non-precoded pilot, the present invention is not limited thereto. For example, the eNB may transmit a plurality of precoded pilots as a reference signal. In this case, the above-described PMI tracking technology is applicable using a preferred pilot index variation value instead of a PMI variation value.

More specifically, the eNB configures a pilot signal for enabling the UE to measure the PPI variation value and feedback related thereto. The UE measures the PPI variation value and performs feedback related thereto. In particular, the UE reports the measured PPI variation value at a period specified by the eNB or only when the PPI variation value is equal to or greater than a predetermined value or the reporting period may be determined according to the PPI variation value.

In order to measure channel variation in the vertical/horizontal direction based on a plurality of precoded pilots, the PPI variation value may be measured/reported with respect to a pilot index of the vertical/horizontal direction. This will be described with reference to the drawings.

Figure 21:
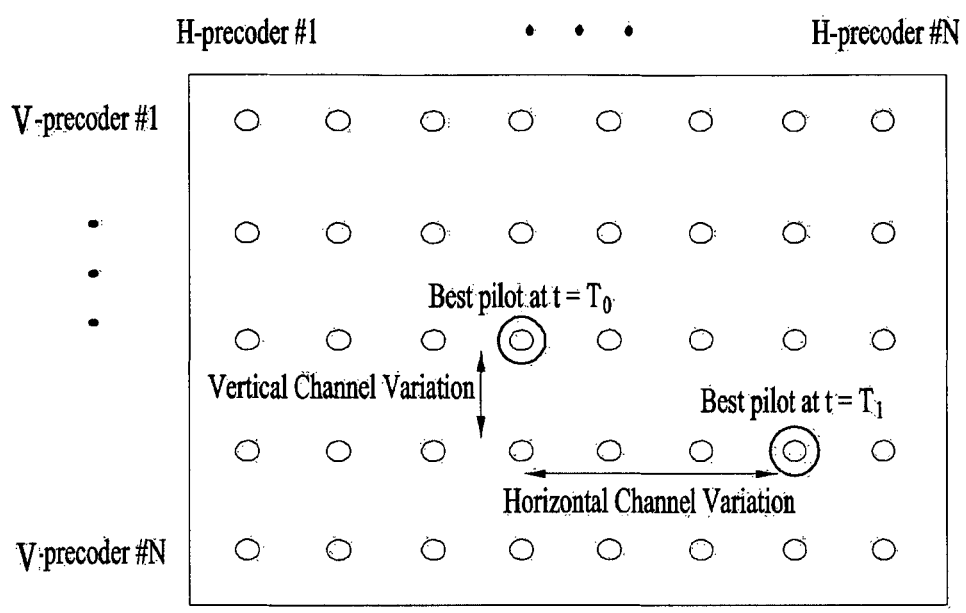
FIG. 21 is a diagram showing an example of measuring and reporting a pilot index in a vertical/horizontal direction according to an embodiment of the present invention.

FIG. 21 is a diagram showing an example of measuring and reporting a pilot index in a vertical/horizontal direction according to an embodiment of the present invention.

Referring to FIG. 21, if a reference signal to which a vertical precoder v and a horizontal precoder h are applied is r(v, h), the UE measures and reports a variation value of a preferred reference signal with respect to the vertical precoder v and the horizontal precoder h. For example, if a reference signal having best signal quality at a time $T_0$ is $r(v_0, h_0)$ and a reference signal having best signal quality at a time $T_1$ is $r(v_1, h_1)$, the PPI variation value in the vertical direction may be $|v_1-v_0|$ and the PPI variation value in the horizontal direction may be $|h_1-h_0|$. This is a method for measuring the channel variation in the vertical and horizontal directions via variation in pilot index having best signal quality.

The above-described technology for measuring channel variation based on the channel quality variation value may be achieved based on a plurality of non-precoded pilots. In this case, the same method is applicable except that a pilot set is used instead of the PMI set.

Figure 22:
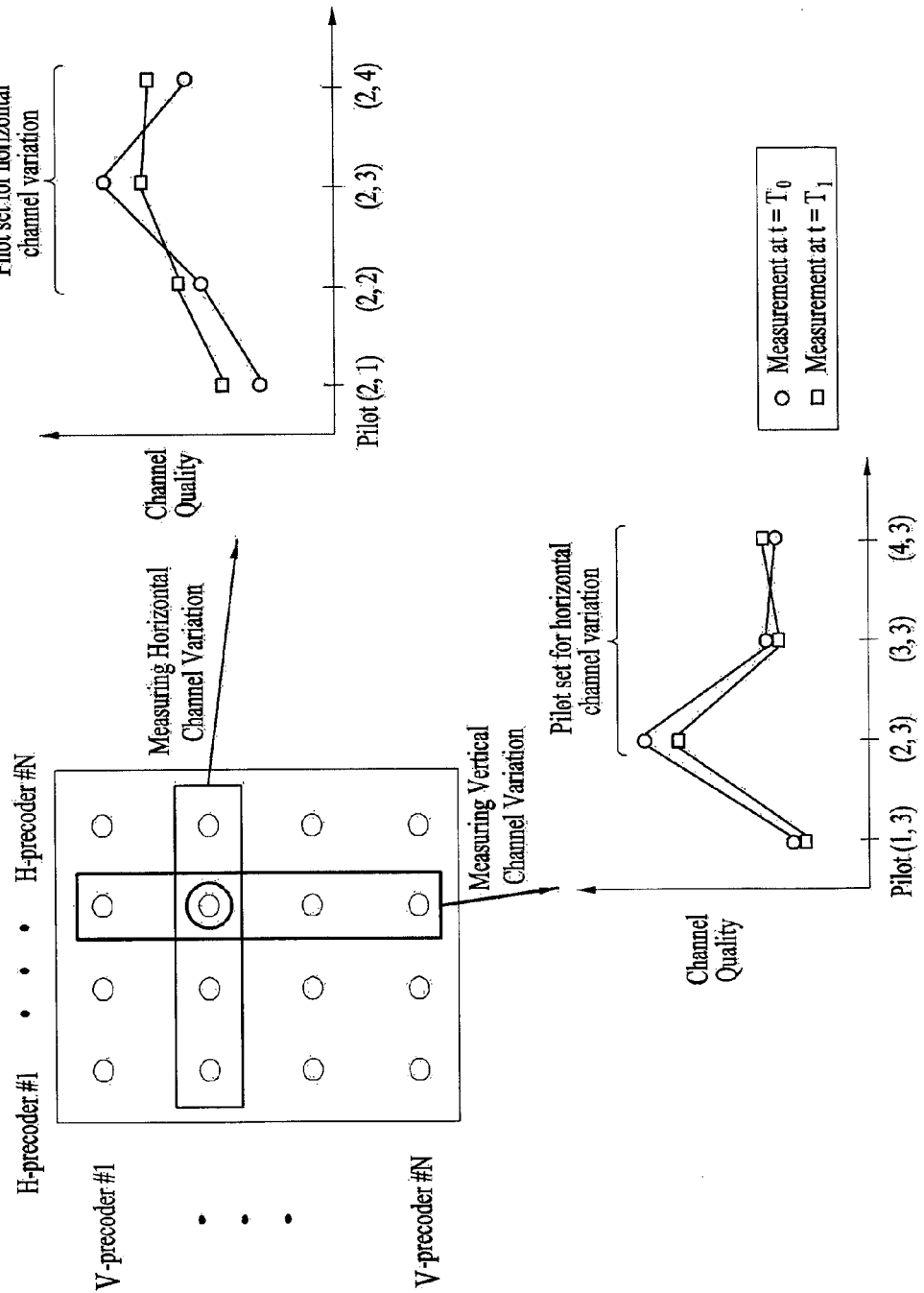
FIG. 22 is a diagram showing an example of measuring and reporting channel variation in a vertical direction and a horizontal direction based on a non-precoded pilot according to an embodiment of the present invention.

FIG. 22 is a diagram showing an example of measuring and reporting channel variation in a vertical direction and a horizontal direction based on a non-precoded pilot according to an embodiment of the present invention.

Referring to FIG. 22, in order to measure channel variation in the vertical and horizontal directions based on the non-precoded pilot, the UE measures channel variation with respect to pilots to which the same horizontal/vertical precoder is applied. At this time, pilot sets for channel variation measurement may be separately configured.

In particular, in FIG. 22, an example of configuring the pilot set for channel measurement in the horizontal/vertical direction based on the PPI if the PPI is not varied with time and measuring channel variation therefrom is shown. More specifically, it is assumed that the pilot set is composed of three pilots having excellent quality from the viewpoint of the UE and an environment in which channel variation in the horizontal direction is relatively large is assumed.

Although the method for measuring channel variation in the vertical/horizontal direction based on the measured value of one fixed vertical/horizontal precoded pilot is proposed in the above example, an average of variation values measured at a plurality of rows or columns may be measured/reported.

In the above-described method, if signal quality of the fixed vertical/horizontal precoded pilot deteriorates (e.g., the direction is a null direction), a problem may occur in measurement accuracy. In order to solve such a problem, the eNB may transmit a precoded pilot in which beam sharpness is decreased in a specific direction.

More specifically, the eNB transmits a precoded pilot to have a narrow beam width in any one of the vertical direction or the horizontal direction and the UE measures a channel quality variation value in each direction.

Figure 23:
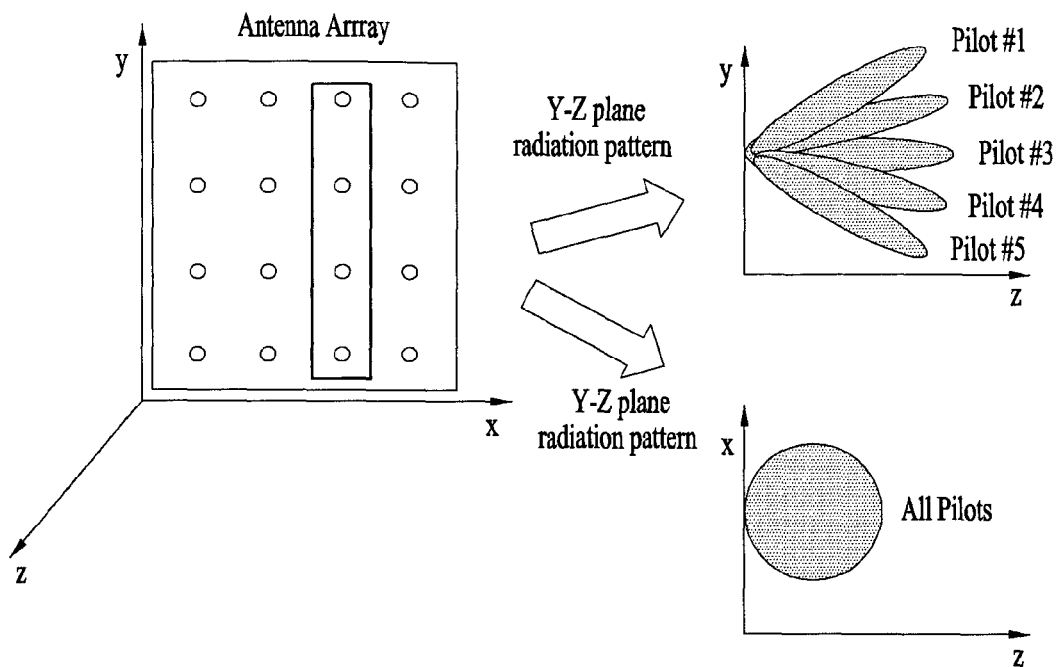
FIG. 23 is a diagram showing another example of measuring and reporting a pilot index in a vertical/horizontal direction according to an embodiment of the present invention.

FIG. 23 is a diagram showing another example of measuring and reporting a pilot index in a vertical/horizontal direction according to an embodiment of the present invention.

Referring to FIG. 23, in order to measure channel variation in the vertical direction, a plurality of pilots is transmitted using antennas corresponding to a specific column of an antenna array only. In this case, since sharp beams are precoded and transmitted in different directions according to the pilot signal in the vertical direction but the same precoding is applied to all pilot signals to have a wide beam width in the horizontal direction, when the UE measures quality variation of each pilot signal, it is possible to measure channel variation in the vertical direction.

Similarly, by generating a beam which is sharp in the horizontal direction but has a wide beam width in the vertical direction using antennas corresponding to a specific row and transmitting a precoded pilot, it is possible to measure channel variation in the horizontal direction.

In application of the present technology, parameters such as channel quality, measurement duration T for PMI or PPI variation, measurement start time T1 and reporting time T2 may be prescribed as standard, may be configured by the network and delivered to the UE via RRC signaling, or may be determined by the UE.

Figure 24:
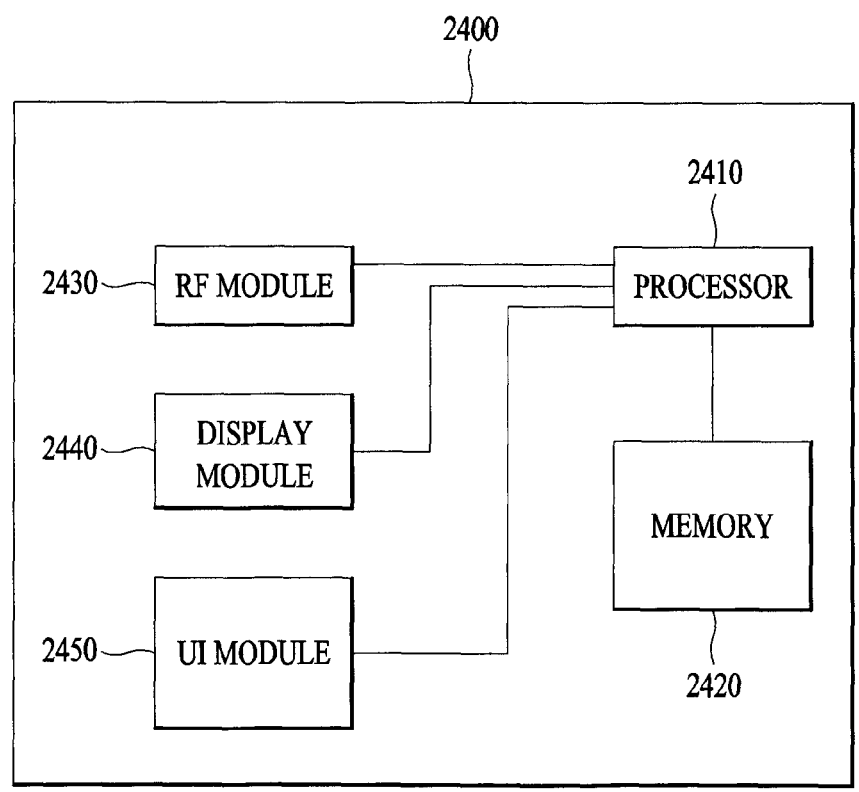
FIG. 24 is a block diagram of a communication apparatus according to one embodiment of the present invention.

FIG. 24 is a block diagram of a communication apparatus according to one embodiment of the present invention.

Referring to FIG. 24, a communication apparatus 2400 includes a processor 2410, a memory 2420, a Radio Frequency (RF) module 2430, a display module 2440 and a user interface module 2450.

The communication apparatus 2400 is shown for convenience of description and some modules thereof may be omitted. In addition, the communication apparatus 2400 may further include necessary modules. In addition, some modules of the communication apparatus 2400 may be subdivided. The processor 2410 is configured to perform an operation of the embodiment of the present invention described with reference to the drawings. For a detailed description of the operation of the processor 2410, reference may be made to the description associated with FIGS. 1 to 23.

The memory 2420 is connected to the processor 2410 so as to store an operating system, an application, program code, data and the like. The RF module 2430 is connected to the processor 2410 so as to perform a function for converting a baseband signal into a radio signal or converting a radio signal into a baseband signal. The RF module 2430 performs analog conversion, amplification, filtering and frequency up-conversion or inverse processes thereof. The display module 2440 is connected to the processor 2410 so as to display a variety of information. As the display module 2440, although not limited thereto, a well-known device such as a Liquid Crystal Display (LCD), a Light Emitting Diode (LED), or an Organic Light Emitting Diode (OLED) may be used. The user interface module 2450 is connected to the processor 2410 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although an example in which a method and apparatus for measuring channel variation for massive antenna array based beamforming in a wireless communication system is applied to a 3GPP LTE system is described, the present invention is applicable to various wireless communication systems in addition to the 3GPP LTE system. Although the present invention relates to a massive antenna, the present invention is applicable to other antenna structures.

The invention claimed is:
1. A method for transmitting feedback information to a base station at a user equipment (UE) in a wireless communication system, the method comprising:
receiving a pilot signal from the base station at a first time and a second time;
measuring first channel quality at the first time and second channel quality at the second time based on the pilot signal; and
transmitting the feedback information including information about a variation value between the first channel quality and the second channel quality to the base station,
wherein the measuring the first channel quality and the second channel quality includes measuring the first channel quality and the second channel quality on the assumption that a predetermined precoding matrix index set is applied.

2. The method according to claim 1, wherein:
the pilot signal includes a plurality of pilot signals defined as a vertical precoder index and a horizontal precoder index, and
the feedback information includes preferred vertical precoder index variation information between a preferred vertical precoder index at the first time and a preferred vertical precoder index at the second time and preferred horizontal precoder index variation information between a preferred horizontal precoder index at the first time and a preferred horizontal precoder index at the second time.

3. The method according to claim 2, wherein the preferred vertical precoder index variation information and the preferred horizontal precoder index variation information are included in the feedback information if the precoder index variation value is equal to or greater than a threshold.

4. The method according to claim 1, further comprising selecting a first precoding matrix index corresponding to the first time and a second precoding matrix index corresponding to the second time from a predetermined codebook based on the pilot signal,
wherein the feedback information includes information about a difference between the first precoding matrix index and the second precoding matrix index.

5. The method according to claim 4, wherein the predetermined codebook is composed of a plurality of precoding matrix indices for rank 1 arranged in order of beamforming angle.

6. A method for receiving feedback information from a user equipment (UE) at a base station in a wireless communication system, the method comprising:
transmitting a pilot signal at a first time and a second time to the UE; and
receiving, from the UE, the feedback information including information about a variation value between first channel quality at the first time and second channel quality at the second time generated using the pilot signal,
wherein the first channel quality and the second channel quality are measured on the assumption that a predetermined precoding matrix index set is applied.

7. The method according to claim 6, wherein:
the pilot signal includes a plurality of pilot signals defined as a vertical precoder index and a horizontal precoder index, and
the feedback information includes preferred vertical precoder index variation information between a preferred vertical precoder index at the first time and a preferred vertical precoder index at the second time and preferred horizontal precoder index variation information between a preferred horizontal precoder index at the first time and a preferred horizontal precoder index at the second time.

8. The method according to claim 7, wherein the preferred vertical precoder index variation information and the preferred horizontal precoder index variation information are included in the feedback information if the precoder index variation value is equal to or greater than a threshold.

9. The method according to claim 6, wherein the feedback information includes information about a difference between a first precoding matrix index corresponding to the first time and a second precoding matrix index corresponding to the second time selected from a predetermined codebook based on the pilot signal.

10. The method according to claim 9, wherein the predetermined codebook is composed of a plurality of precoding matrix indices for rank 1 arranged in order of beamforming angle.

* * * * *